Oct. 5, 1943.  G. A. KUMLER  2,331,201
FLOOR FURNACE
Filed July 12, 1940
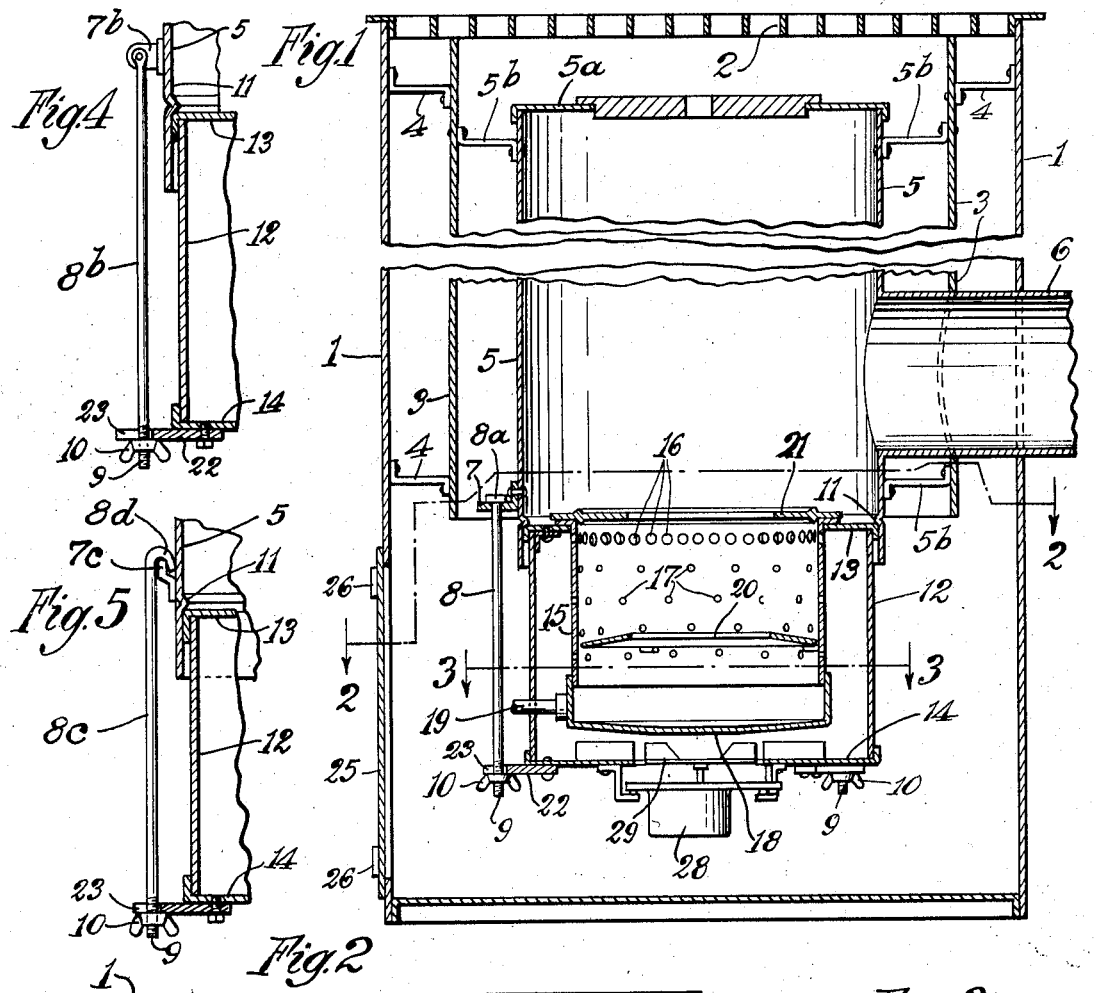
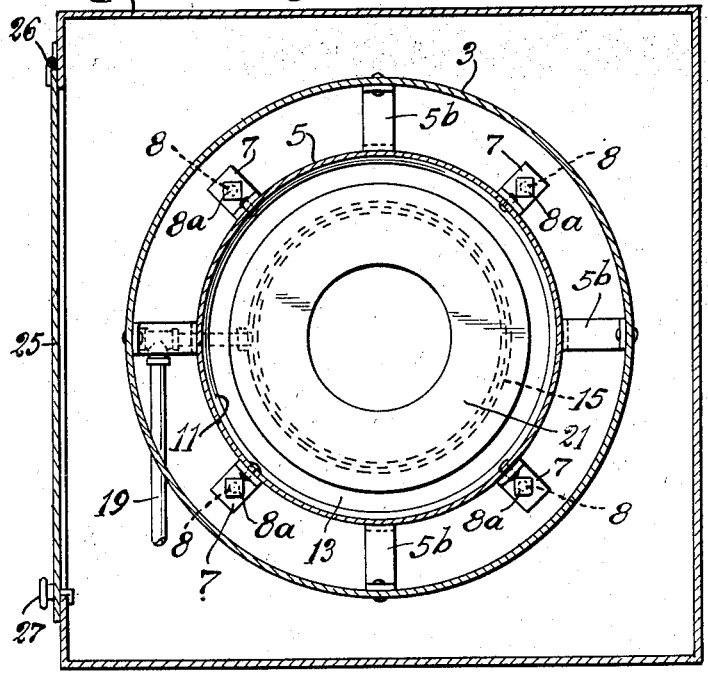
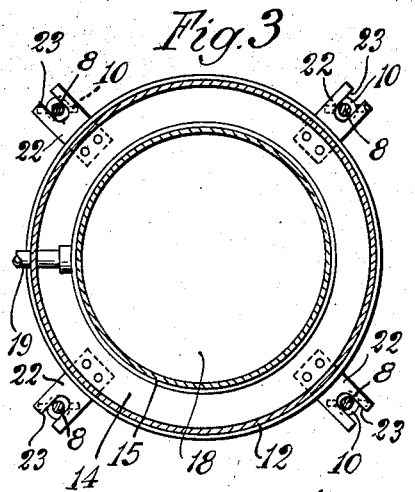
Inventor
George A. Kumler
by Parker & Carter
Attorneys Patented Oct. 5, 1943

2,331,201

UNITED STATES PATENT OFFICE 2,331,201

FLOOR FURNACE

George A. Kumler, Los Angeles, Calif., assignor to Oil Devices, Santa Fe, N. Mex., a limited partnership of Illinois Application July 12, 1940, Serial No. 345,133

3 Claims. (Cl. 126—116)

My invention relates to an improvement in securing or positioning means for positioning pots of pot type burners.

One purpose is the provision of means for giving ready access to pot type burners when used in connection with floor furnaces.

Another purpose is the provision of readily detachable securing means for such pots for pot type burners, adapted to permit their ready removal from furnaces or burner units, such for example as floor furnaces.

Other purposes will appear from time to time in the course of the specification and claims.

I illustrate my invention more or less diagrammatically in the accompanying drawing wherein:

Fig. 1 is a vertical axial section;

Fig. 2 is a section on the line 2—2 of Fig. 1;

Fig. 3 is a section on the line 3—3 of Fig. 1;

Fig. 4 is a variant form of a portion of my device; and

Fig. 5 is another variant form of a portion of my device.

Like parts are indicated by like symbols throughout the specification and drawing.

Referring to the drawing, 1 generally indicates a floor furnace housing, which may be of any suitable form, but which is herein shown as generally rectangular in cross section. Its upper end may be closed for example by a floor grille or the like, indicated at 2. 3 indicates an inside sleeve, herein shown as cylindrical, and mounted on the housing 1 by means of any suitable brackets or connectors 4. 5 is an inner burner drum, herein shown as cylindrical in form, and having a top 5a. It may be mounted upon the sleeve 3 by means for example of connecting brackets or the like 5b. It is provided with an outlet flue 6, one side thereof extending outwardly through the drum 3 and the housing 1, as shown for example in Fig. 1.

The bottom of the drum 5 is shown as provided with a plurality of exteriorly extending lugs or supports 7, which may be apertured to receive the downwardly depending bolts 8, headed as at 8a, and provided with a screw-threaded bottom portion 9, adapted to receive wing nuts or the like 10. The bottom portion of the drum 5 is also provided with an inwardly extending abutment member, herein shown as an inwardly rolled portion 11.

12 indicates an outer pot housing having an inwardly extending top flange 13 and a bottom flange or partial closure 14. 15 is the pot proper, having at its upper portion secondary air inlets 16, and having scattered through its lower portion at various levels primary air inlets 17. 18 is a slightly concave bottom therefor, and 19 any suitable inlet passage extending to a source of liquid fuel not herein shown. 20 is any suitable pilot baffle, the details of which do not form part of the present invention.

It will be noted that the top flange 13 constitutes a complete top closure for the space between the pot 15 and the outer housing 12. 21 indicates any suitable top ring which partially restricts the open top of the pot, and which may rest on the upper edge of the pot in any suitable manner. Outwardly extending lugs 22 are spaced about the bottom of the member 12, being secured for example at the bottom 14. They are shown as outwardly extending and as having notches 23 adapted to receive the lower ends of the securing bolts 8.

25 is an axised door in the lower portion of the housing 1, which may be hinged for example as at 26 and may be provided with any suitable securing means 27. It will be understood, of course, that the door may be secured in position by a variety of means.

Any suitable means may be employed for delivering air to the space between the members 12 and 15, and for thereby delivering primary and secondary air through the inlets 17 and 16, respectively. For illustrative purposes I show a unit which includes a motor 28 and a fan 29. It will be understood that the motor and fan deliver air from the space within the housing 1.

Referring to Figs. 4 and 5, I illustrate variant means of securing the pot unit in place. In Fig. 4, for example, I illustrate ears 7b, to which bolts 8b may be hinged. In Fig. 5 I illustrate abutment flanges 7c, to which bolts 8c may be secured, as by an upper hook portion 8d.

In the use of the device, if access is desired to the pot unit, or when its removal is required, the operator simply opens the door 25, loosens the wing nuts 10, swings the bolts 8, 8b or 8c outwardly, and drops the entire pot unit, which can then be readily removed outwardly laterally through the door 25.

It will be realized that whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

I claim:

1. In a floor furnace and burner therefor, an outer shell having a top aperture opening into the space to be heated, a heater drum supported on and mounted within said shell, its upper end terminating below the plane of the top of the outer shell, its lower end terminating substantially above the bottom of the shell, a flue for said drum extending outwardly through the side of said shell, said shell having a side access aperture adjacent the bottom thereof, and a removable closure therefor, and a burner unit including a pot and an outer housing surrounding said pot, and means for directing air into the space between said outer housing and the pot, said burner unit and air directing means being of such dimensions in relation to said access aperture as to be insertible or removed bodily therethrough, and means for removably securing said burner unit in relation to said heater drum, including manually operable connections located in horizontal alignment with said access aperture.

2. In a floor furnace and burner therefor, an outer shell having a top aperture opening into the space to be heated, a heater drum supported on and mounted within said shell, its upper end terminating below the plane of the top of the outer shell, its lower end terminating substantially above the bottom of the shell, a flue for said drum extending outwardly through the side of said shell, said shell having a side access aperture adjacent the bottom thereof, and a removable closure therefor, and a burner unit including a pot and an outer housing surrounding said pot, said burner unit being of such dimensions in relation to said access aperture as to be insertible or removed bodily therethrough, and means for removably securing said burner unit in relation to said heater drum, including manually operable connections located in horizontal alignment with said access aperture.

3. In a floor furnace and burner therefor, an outer shell having a top aperture opening into the space to be heated, a heater drum supported on and mounted within said shell, its upper end terminating below the plane of the top of the outer shell, its lower end terminating substantially above the bottom of the shell, a flue for said drum extending outwardly through the side of said shell, said shell having a side access aperture adjacent the bottom thereof, and a removable closure therefor, and a burner unit including a pot and an outer housing surrounding said pot, said burner unit being of such dimensions in relation to said access aperture as to be insertible or removed bodily therethrough, and means for removably securing said burner unit in relation to said heater drum, including one or more tension members extending downwardly from the heater drum, and movable in relation thereto when released, abutments on the outer housing about the pot, and manually operable connections between said abutments and said depending tension members located in horizontal alignment with said access aperture, the burner unit and the bottom of the heater drum being provided with opposed abutment means, whereby when the securing means have been moved to securing position, the burner unit is firmly secured to the bottom of the heater drum.

GEORGE A. KUMLER.